Nov. 6, 1934.                    A. A. SMITH                    1,979,712
                                  WELDING
                              Filed Jan. 7, 1932
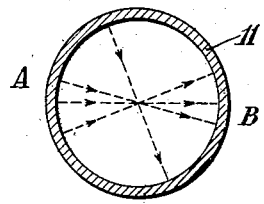
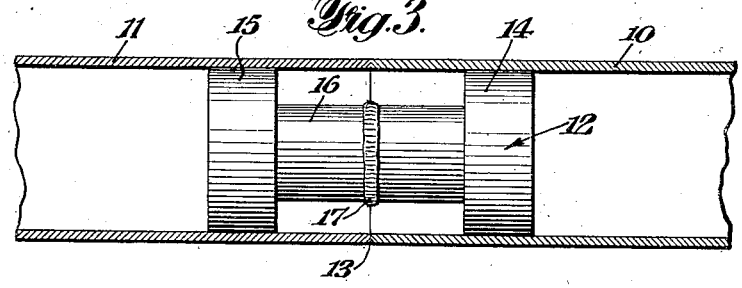
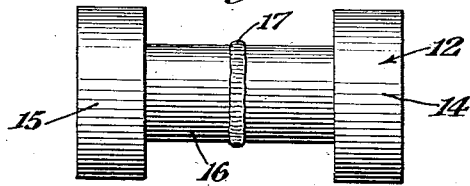
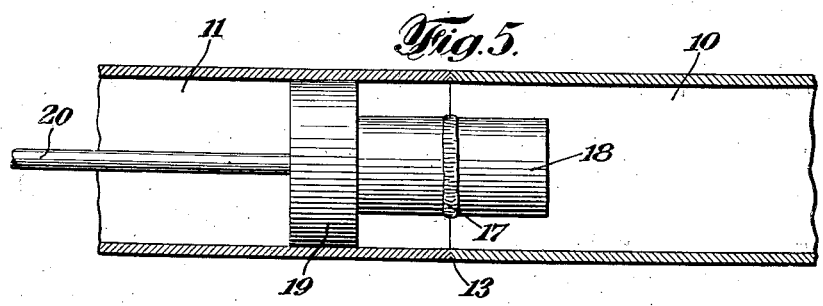
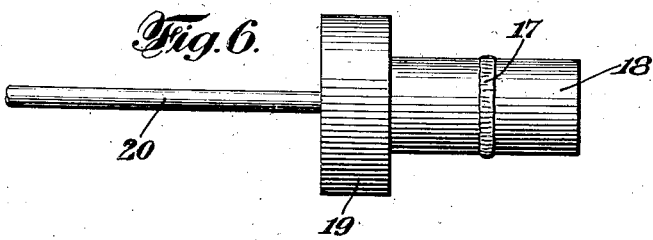
INVENTOR
Albert A. Smith
BY Heina & Rauber
his ATTORNEYS Patented Nov. 6, 1934

1,979,712

UNITED STATES PATENT OFFICE 1,979,712

WELDING

Albert A. Smith, Riverdale, N. J., assignor to Metropolitan Engineering Company, Brooklyn, N. Y., a corporation of New York Application January 7, 1932, Serial No. 585,230

3 Claims. (Cl. 219—4)

My invention relates to improvements in methods and apparatus for welding particularly for a type of electric arc or flash welding and relates more specially to means to prevent metal expelled from the arc from impinging and clinging to work pieces being welded.

In certain types of welding, such as flash welding, an arc is produced between two surfaces to be welded in order to obtain the proper welding conditions. Particles of the metal are expelled from the arc with considerable force and at a high temperature and, therefore, ahere firmly to any metal surface on which they impinge. When these particles strike a portion of the surface of one or both of the parts being welded they form or build up a deposit that is usually difficult to remove. This condition is particularly bad in the welding of certain metal, such as cast iron, where a considerable arc or flash is necessary to produce the desired welding. When the two pieces to be welded are tubular or hollow, the formation of an adherent deposit is more marked and is difficult to remove.

An object of the present invention is to provide a method of welding in which the deposition of metal thrown out from an arc in welding methods of this type may be prevented from striking and adhering to or forming deposits on the surface of the pieces being welded.

Another object is to provide a device or apparatus for use in welding by which the metal projected up from the arc may be intercepted and received and thus prevented from striking and adhering to the work pieces.

Other objects of the invention will be apparent from the following description.

The various features of the invention are illustrated in the accompanying drawing in which Fig. 1 is a diagrammatic cross-section of a tubular article showing the direction in which particles are projected diametrically through the interior of the article toward opposite walls thereof when two pieces are being welded end to end by a flash or arc welding operation;

Fig. 2 is a diagrammatic cross-sectional view similar to that of Fig. 1 showing the position of a metal intercepting device of the present invention and indicating the manner in which diametrically projected particles are intercepted;

Fig. 3 is a longitudinal section of two pieces of tubular or hollow construction joined end to end by a flash weld and showing the intercepting device and the manner in which the deposits from the arc are received thereon;

Fig. 4 is a side view of the intercepting device after its removal from the welded pieces showing the deposit of metal from the welding arc;

Figs. 5 and 6 are views similar to Figs. 3 and 4 respectively, showing a modified form of intercepting device.

In the welding end-to-end of a pair of tubular articles 10 and 11, as illustrated in the accompanying drawing, it will be apparent that an arc formed between the opposed ends will tend to throw out particles of metal in all directions. Those particles that are projected at only a slight angle of divergence from the plane of the weld will impinge directly or almost at right angles, and after a very short path of travel in a heated atmosphere, on to the opposite surface of the parts near the weld. Consequently they will tend to build up about the weld or on each side of it a firmly adherent deposit. The paths of the projected particles which strike the metal most directly and have the shortest path of travel take a path through the interior of the tubular pieces, that is, approximately or very nearly diametric. They travel through the central part of the article as indicated by the arrows in Fig. 1.

In accordance with the present invention, an intercepting piece or mandrel 12 is inserted into the hollow articles extending through the plane of the weld 13, as indicated in Fig. 3. This mandrel 12 preferably has end portions 14 and 15 fitting the interior of the pieces 10 and 11 respectively and a part 16 of reduced diameter extending through the plane of the weld so as to fill the central part thereof and to be spaced a sufficient distance from the arc so as not to be unduly heated thereby.

The particles of metal projected inwardly from the weld are received on the central part 16 of the mandrel or intercepting piece and instead of reaching the diametrically opposite part of the pieces are caught on the central part 16 of the mandrel and form a deposit 17 thereon. After the welding operation has been completed the mandrel or intercepting member 12 is removed from the center of the welded pieces and the deposit 17 may be broken therefrom. The manner in which the inwardly projecting particles strike the central part of the mandrel 12 is indicated in Fig. 2.

The modified form of the invention shown in Figs. 5 and 6 comprises a central stem 18 corresponding to the portion 16 of the mandrel 12 and extending centrally through the plane of the weld and having a shoulder 19 at one end to support and position it in the welded pieces, and having a handle or stem 20 whereby it may be inserted into and removed from the pieces 10 and 11.

In the manner described above, a deposit 17 is formed on the stem 18 and may be easily removed after the intercepting device is removed from the welded articles.

The invention has been described in connection with the welding of a tubular article of circular cross-section, but it will be apparent that it may be applied to any type of article by a suitable modification of the mandrel or intercepting device whereby an intercepting surface may be interposed between the arc and any surface of the pieces on to which metal may be projected from the arc. It will be understood that the intercepting device may be made of any suitable material. The central part 16 or 17 may be made of metal in which case the supporting and positioning parts 14, 15, 19 are of insulating material.

What I claim is:

1. A device for intercepting particles projected from an arc formed in flash welding within and spaced between two spaced walls of parts being welded end to end which comprises a surface between said walls being welded and spaced from each wall, and means for supporting said receiving surface to extend between said walls through the plane of the weld.

2. A device for intercepting particles projected inwardly from the arc formed in flash welding two hollow pieces end to end which comprises a central surface of less diameter than said pieces being welded at the weld, and means for supporting said receiving surface to extend centrally through the plane of the weld.

3. A device for intercepting particles projected inwardly from the arc formed in flash welding two hollow pieces to each other which comprises a metallic receiving surface of less diameter than said pieces at said weld and means for supporting said receiving surface centrally through the plane of said weld.

ALBERT A. SMITH.